(12) United States Patent
Satran

(10) Patent No.: US 6,929,427 B2
(45) Date of Patent: Aug. 16, 2005

(54) CUTTING INSERT AND MILLING CUTTER

(75) Inventor: Amir Satran, Kfar Vradim (IL)

(73) Assignee: Iscar Ltd., Tefen (IL)

( * ) Notice: Subject to any disclaimer, the term of this patent is extended or adjusted under 35 U.S.C. 154(b) by 175 days.

(21) Appl. No.: 10/455,023

(22) Filed: Jun. 4, 2003

(65) Prior Publication Data

US 2004/0131431 A1 Jul. 8, 2004

(30) Foreign Application Priority Data

Jun. 4, 2002 (IL) .................................................. 150015

(51) Int. Cl.⁷ .............................................. B23B 27/16
(52) U.S. Cl. ........................... 407/42; 407/61; 407/113
(58) Field of Search ................................ 407/42, 48, 47, 407/49, 61, 103, 108, 113

(56) References Cited

U.S. PATENT DOCUMENTS

| | | | | | |
|---|---|---|---|---|---|
| 3,484,919 | A | * | 12/1969 | Stier | 407/77 |
| 4,028,782 | A | * | 6/1977 | Stansak | 407/113 |
| 4,294,566 | A | * | 10/1981 | Boone | 407/114 |
| 4,558,975 | A | * | 12/1985 | Hale | 408/186 |
| 4,597,695 | A | * | 7/1986 | Johnson | 407/113 |
| 5,236,288 | A | * | 8/1993 | Flueckiger | 407/36 |
| 5,365,805 | A | * | 11/1994 | Pantzar et al. | 76/101.1 |
| 5,421,679 | A | * | 6/1995 | Pantzar et al. | 407/114 |
| 5,441,370 | A | * | 8/1995 | Pantzar et al. | 407/113 |
| 5,443,334 | A | | 8/1995 | Pantzar | |
| 5,454,670 | A | * | 10/1995 | Noda et al. | 407/42 |
| 5,622,461 | A | * | 4/1997 | Tukala et al. | 408/224 |
| 5,685,670 | A | * | 11/1997 | Satran | 407/42 |
| 5,727,910 | A | * | 3/1998 | Leeb | 407/34 |
| 5,810,519 | A | * | 9/1998 | Vogel et al. | 407/114 |
| 5,921,721 | A | * | 7/1999 | Hintze et al. | 407/113 |
| 5,947,650 | A | * | 9/1999 | Satran et al. | 407/113 |
| 5,957,633 | A | * | 9/1999 | Hall | 408/187 |
| 5,975,812 | A | * | 11/1999 | Friedman | 407/114 |
| 6,004,081 | A | | 12/1999 | Hellstrom et al. | |
| 6,048,140 | A | | 4/2000 | Johnson | |
| 6,142,716 | A | | 11/2000 | Jordberg et al. | |
| 6,152,658 | A | * | 11/2000 | Satran et al. | 407/103 |
| 6,164,878 | A | * | 12/2000 | Satran et al. | 407/113 |
| 6,234,724 | B1 | * | 5/2001 | Satran et al. | 407/43 |
| 6,238,146 | B1 | * | 5/2001 | Satran et al. | 407/113 |
| 6,270,292 | B1 | * | 8/2001 | Satran et al. | 407/42 |
| 6,503,028 | B1 | * | 1/2003 | Wallstrom | 407/35 |
| 6,733,212 | B2 | * | 5/2004 | Nagaya et al. | 407/34 |
| 6,796,750 | B2 | * | 9/2004 | Men | 407/35 |

FOREIGN PATENT DOCUMENTS

| | | |
|---|---|---|
| DE | 19743971 | 6/1997 |
| JP | 08-071830 | 3/1996 |
| WO | WO02/058873 | 8/2002 |

* cited by examiner

Primary Examiner—Daniel W. Howell
Assistant Examiner—Sara Addisu
(74) Attorney, Agent, or Firm—Womble Carlyle

(57) ABSTRACT

A milling cutter has a cutter body having insert pockets, with cutting inserts seated in the insert pockets. Each insert pocket has adjacent side and rear walls generally transverse to a base, the side wall being provided with two spaced apart generally flat and non-coplanar side support surfaces. Each cutting insert has a pair of opposing major side surfaces including two spaced apart generally flat and non-coplanar abutment surfaces. Upper edges of the side support surfaces abut the abutment surfaces.

11 Claims, 7 Drawing Sheets

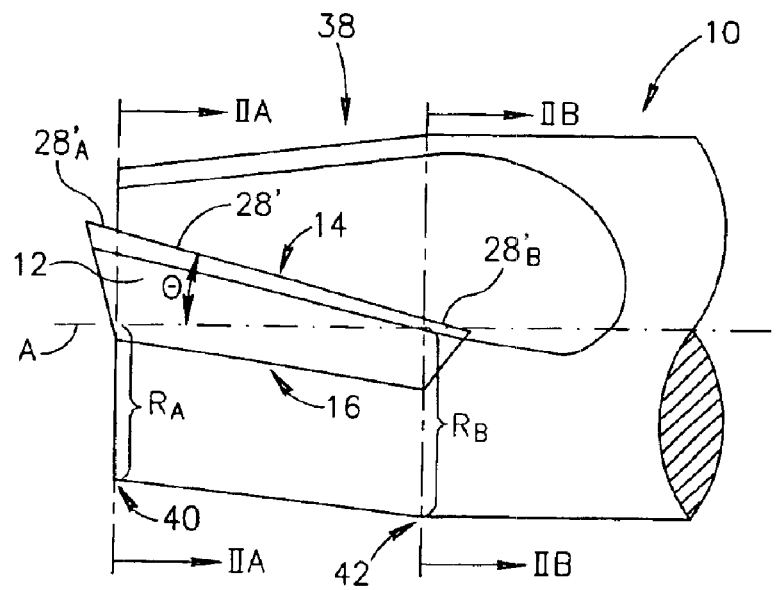
FIG.1
PRIOR ART
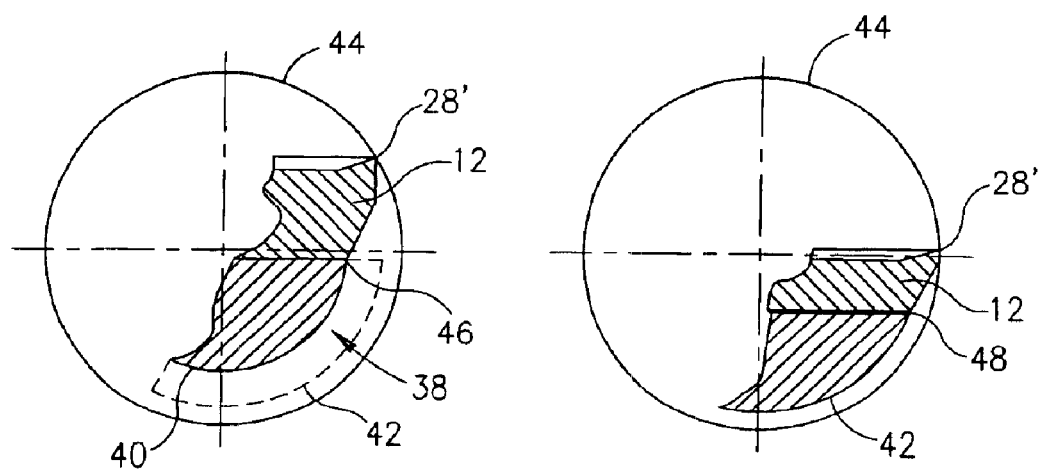
FIG.2A
PRIOR ART
FIG.2B
PRIOR ART

CUTTING INSERT AND MILLING CUTTER

FIELD OF THE INVENTION

The present invention relates to replaceable indexable cutting inserts and milling cutters in general and in particular for milling square shoulders in a workpiece.

BACKGROUND OF THE INVENTION

A typical prior art milling cutter 10 having an axis of rotation A, and prior art cutting insert 12 for milling square shoulders in workpieces is shown in FIGS. 1 to 4. The prior art cutting insert 12 is generally rhomboidal in shape, having a top surface 14, a bottom surface 16, two major side surfaces 18 and two minor side surfaces 20. Some prior art inserts of this kind are also generally rectangular in shape. The two minor side surfaces 20 are provided with protruding portions 22. The major and minor side surfaces 18, 20 join the top surface 14 along a top edge 24, and the bottom surface along a bottom edge 26. FIG. 4 shows an illustrative bottom view of the prior insert of FIG. 1. The prior art milling cutter 10 has been removed so that the radial location of various parts of the prior art cutting insert 12 with respect to the axis of rotation A can be seen. The axial rake cannot be distinguished in this view, hence it appears that the axis A is parallel to the bottom surface 16 of the prior art cutting insert 12, but this is not the case, as can be seen in FIG. 1. As seen in FIG. 4, the top and bottom edges 24, 26 have a generally rhomboidal shape. The top edge 24 comprises two opposing major edges 28, constituting two major cutting edges, and two minor edges 30. The section of each minor edge 30 located on an associated protruding portion 22 constitutes a wiper 32. The bottom edge 26 has two opposing long edges 34 and two opposing short edges 36. The prior art cutting insert 12 has a basically positive geometry. That is, the included angle between the major and minor side surfaces 18, 20 and the bottom surface 16, taken between tangent planes to these surfaces at the bottom edge 26, is obtuse, whereas, the included angle between the major and minor side surfaces 18, 20 and the top surface 14, taken between tangent planes to these surfaces at the top edge 24, is acute.

As shown in FIG. 1 the prior art cutting insert 12 is seated in the milling cutter 10 with a positive axial rake; the axial rake angle being denoted by θ, with an operative major cutting edge 28' positioned for peripheral milling. The other of the two major cutting edges 28 is not seen in the figures. The milling cutter 10 tapers forwardly at a forward portion 38 thereby giving it a conical shape. The forward portion 38 has a forward end 40 having a radius $R_A$ and a rear end 42 having a radius $R_B$, where $R_B$ is greater than $R_A$. The operative major cutting edge 28' has a leading end $28'_A$ adjacent the forward end 40 and a trailing end $28'_B$ distal the forward end 40. As shown in FIGS. 2A, 2B and 3, the operative major cutting edge 28' defines a cutting circle 44, which is included for reference. In FIG. 2A, the location of the rear end 42 of the milling cutter 10 has been marked with a dashed line showing the relative location of the forward and rear ends 40, 42 of the forward portion 38 relative to the cutting circle 44.

With reference to FIG. 4, it can be seen that when the cutting insert 12 is seated in the milling cutter 10, its bottom surface 16 has a forward radially outer bottom corner 46 and a rear radially outer bottom corner 48. It can also be seen that the operative major cutting edge 28' in the region of its leading end $28'_A$ is located at a greater radial distance from the forward radially outer bottom corner 46 than it is in the region of its trailing end $28'_B$ from the rear radially outer bottom corner 48. Therefore, disadvantageously, the leading end $28'_A$ of the operative major cutting edge 28', which is subject to greater cutting forces than its trailing end $28'_B$, is provided with less support than the trailing end $28'_B$.

A milling cutter with a conical forward end is weaker than one with a cylindrical forward end. FIG. 3 shows a cylindrical milling cutter 50, that is, a milling cutter with a cylindrical forward portion 51. The cylindrical forward portion 51 has a forward end 52 having a radius $R_B$ equal to that of the rear end of the cylindrical forward portion 51 (not shown). If the prior art cutting insert 12 is seated in the cylindrical milling cutter 50, as shown in FIG. 3, then the forward radially outer bottom corner 46 of the prior art cutting insert 12 will be located at a radial distance $R_A$. Since $R_A$ is smaller than $R_B$ the forward radially outer bottom corner 46 of the cutting insert 12 does not reach the periphery 53 of the cylindrical milling cutter 50. On the other hand, the rear radially outer bottom corner 48 does reach the periphery 53. Therefore, the long edge 34 of the bottom edge 26 joining the rear and forward radially outer bottom corner 48, 46 will not reach the periphery 53 of the milling cutter 50, apart from at the rear radially outer bottom corner 48. Therefore, the prior art cutting insert 12 will not be properly seated in the cylindrical milling cutter 50.

Clearly, the prior art cutting insert 12 has to be redesigned in order to be correctly seated. For a cylindrical milling cutter 50, designed to mill a square shoulder in a workpiece and for a cutting insert that is seated with a positive axial rake, the major side surfaces of the cutting insert will not be flat but generally twisted.

SUMMARY OF THE INVENTION

In accordance with the present invention there is provided a cutting insert comprising:
  a top surface, a bottom surface, and a peripheral side surface extending therebetween, the peripheral side surface comprising a pair of opposing major side surfaces and a pair of opposing minor side surfaces;
  two opposing major cutting edges formed at the intersection of the opposing major side surfaces with the top surface;
  wherein each one of the pair of opposing major side surfaces comprises two spaced apart generally flat and non-coplanar abutment surfaces.

In accordance with the present invention, a first of the two spaced apart abutment surfaces makes a first angle α with a normal N to a plane P passing through the bottom surface of the cutting insert and a second of the two spaced apart abutment surfaces makes a second angle β with the normal N.

In accordance with the present invention, the first angle α is greater than the second angle β.

Preferably, each major side surface further comprises at least one upper relief surface disposed between the abutment surfaces and the major cutting edge, and forming a relief angle γ with the normal N.

Further preferably, each major side surface further comprises at least one lower relief surface disposed between the abutment surfaces and the bottom surface.

Typically, the cutting insert is provided with at least one through bore extending between the top and bottom surfaces.

There is also provided in accordance with the present invention, a milling cutter comprising:

at least one cutting insert in accordance with the present invention, and a cutter body having at least one insert pocket, the at least one insert pocket comprising:

adjacent side and rear walls generally transverse to a base, the side wall being provided with two spaced apart generally flat and non-coplanar side support surfaces, a forward side support surface and a rear side support surface, the forward side support surface makes a third angle α' with a normal N' to a plane P' passing through the base and the rear side support surface makes a fourth angle β' with the normal N'.

In accordance with the present invention, the third angle α' is greater than the fourth angle β'.

Further in accordance with the present invention, the first angle α is greater than the third angle α' by a first angle difference $\delta_1$ and the second angle β is greater than the fourth angle β' by a second angle difference $\delta_2$.

Preferably, the first and second angle differences $\delta_1, \delta_2$ are identical and equal to a given angle difference δ.

In accordance with the present invention, the forward side support surface has an upper edge and the rear side support surface has an upper edge and the upper edge of the forward side support surface abuts the first abutment surface of a given major side surface of the at least one cutting insert and the upper edge of the rear side support surface abuts the second abutment surface of the given major side surface of the at least one cutting insert.

In accordance with a specific non-binding example, the first angle α is approximately 14°, the second angle β is approximately 5° and the given angle difference δ is approximately 0.5°.

There is also provided in accordance with the present invention, a cutter body having at least one insert pocket, the at least one insert pocket comprising:

adjacent side and rear walls generally transverse to a base, the side wall being provided with two spaced apart generally flat and non-coplanar side support surfaces, a forward side support surface and a rear side support surface, the forward side support surface makes a third angle α' with a normal N' to a plane P' passing through the base and the rear side support surface makes a fourth angle β' with the normal N'.

BRIEF DESCRIPTION OF THE DRAWINGS

For a better understanding the invention will now be described, by way of example only, with reference to the accompanying drawings in which:

FIG. 1 is a partial side view of a prior art milling cutter;

FIG. 2A is a partial cross-sectional view of the milling cutter in FIG. 1 taken along the line IIA—IIA;

FIG. 2B is a partial cross-sectional view of the milling cutter in FIG. 1 taken along the line IIB—IIB;

FIG. 5 is a perspective schematic view of the cutting insert in accordance with the present invention;

DETAILED DESCRIPTION OF THE INVENTION

Figure 4:
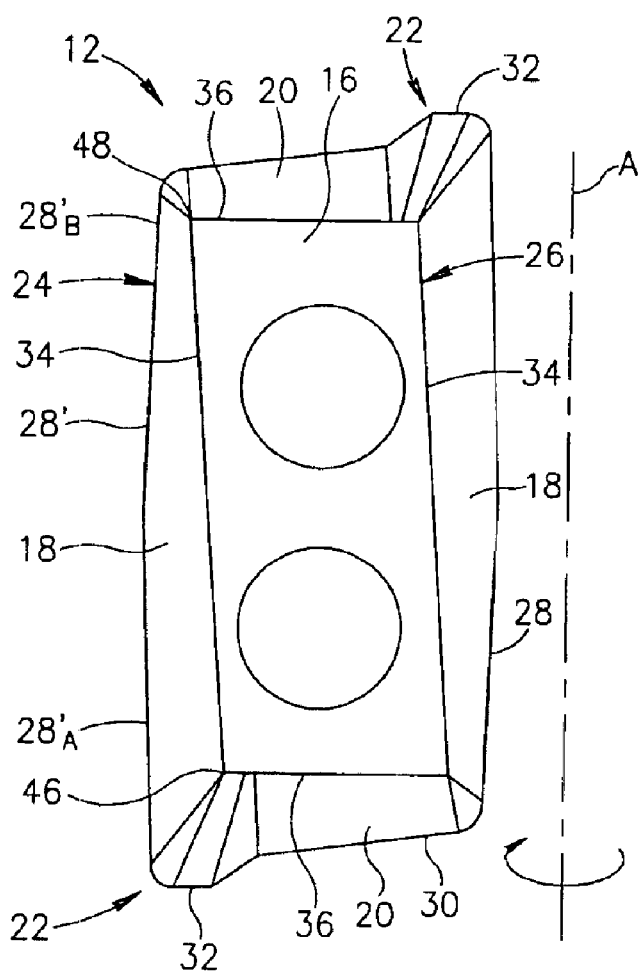
FIG. 4 is an illustrative bottom view of the prior art insert of FIG. 1 showing its radial orientation with reference to the axis of rotation of a prior art milling cutter in which it is seated, with the milling cutter removed.
Figure 6B:
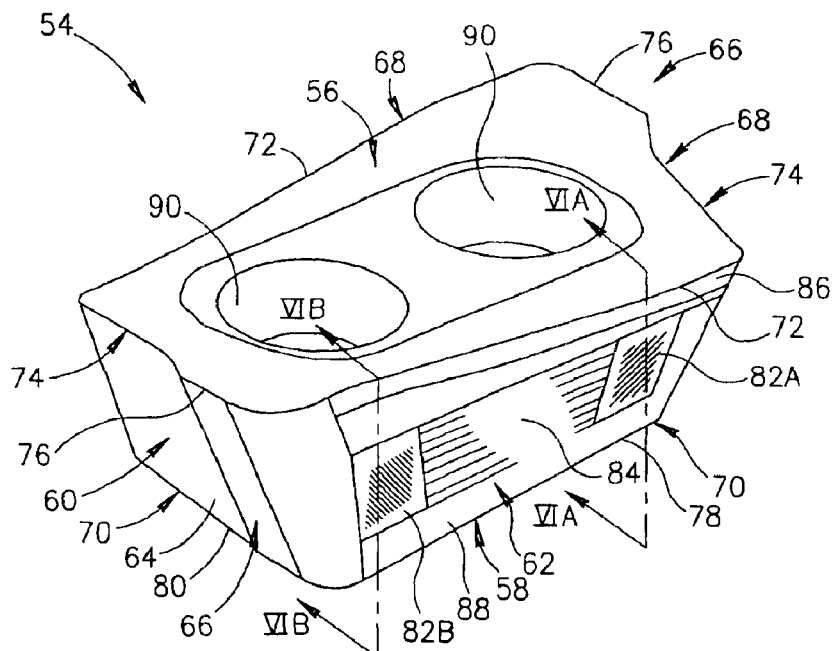
FIG. 6B is a partial cross-sectional view of the cutting insert shown in FIG. 5 taken along the line VIB—VIB.
Figure 6A:
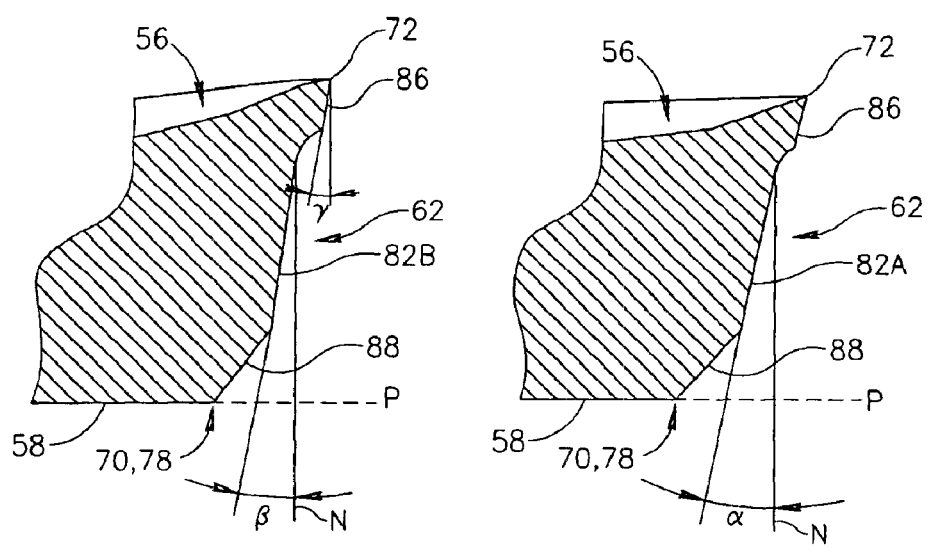
FIG. 6A is a partial cross-sectional view of the cutting insert shown in FIG. 5 taken along the line VIA—VIA.
Figure 7:
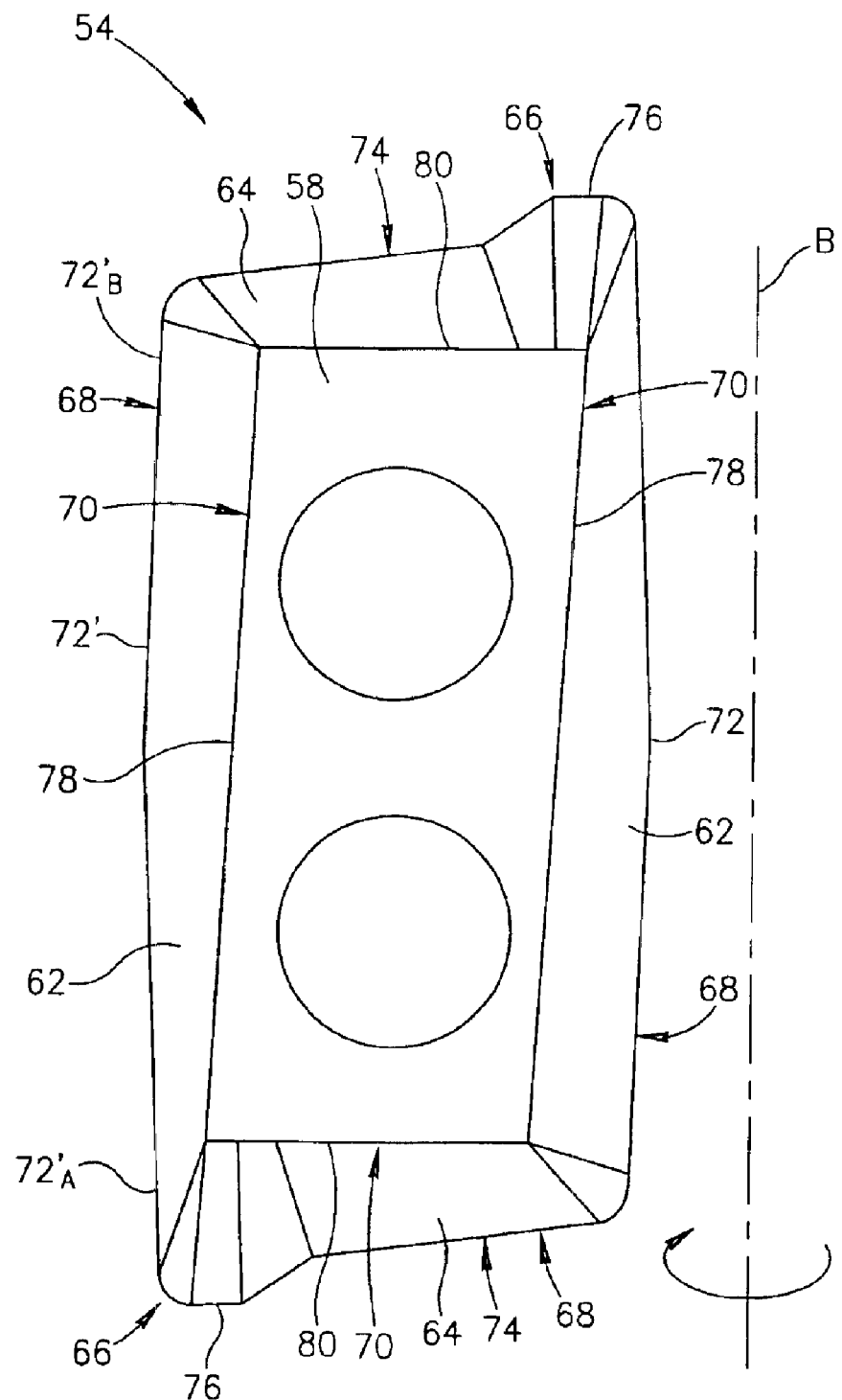
FIG. 7 is an illustrative bottom view of the insert of FIG. 5 showing its radial orientation with reference to the axis of rotation of a cylindrical milling cutter in which it is seated, with the milling cutter removed.
Figure 8:
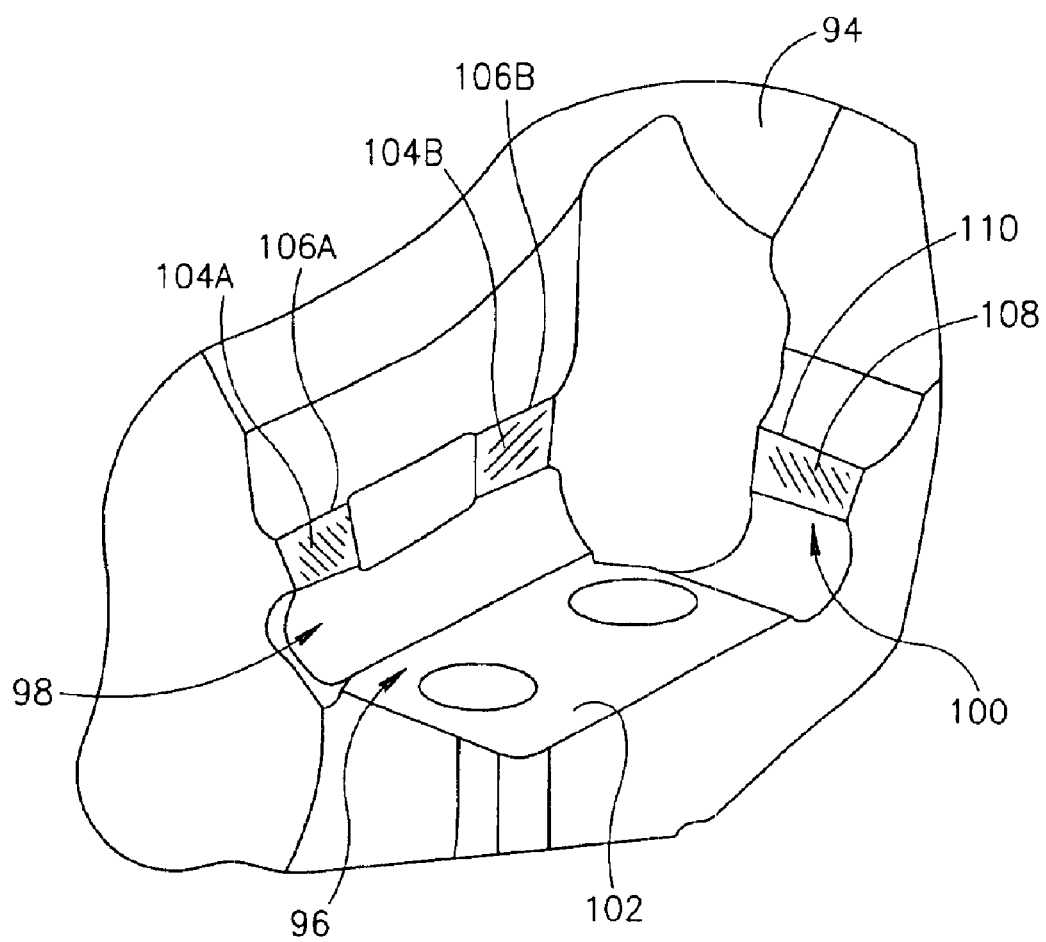
FIG. 8 is a perspective view of an insert pocket of a milling cutter in accordance with the present invention.
Figure 9:
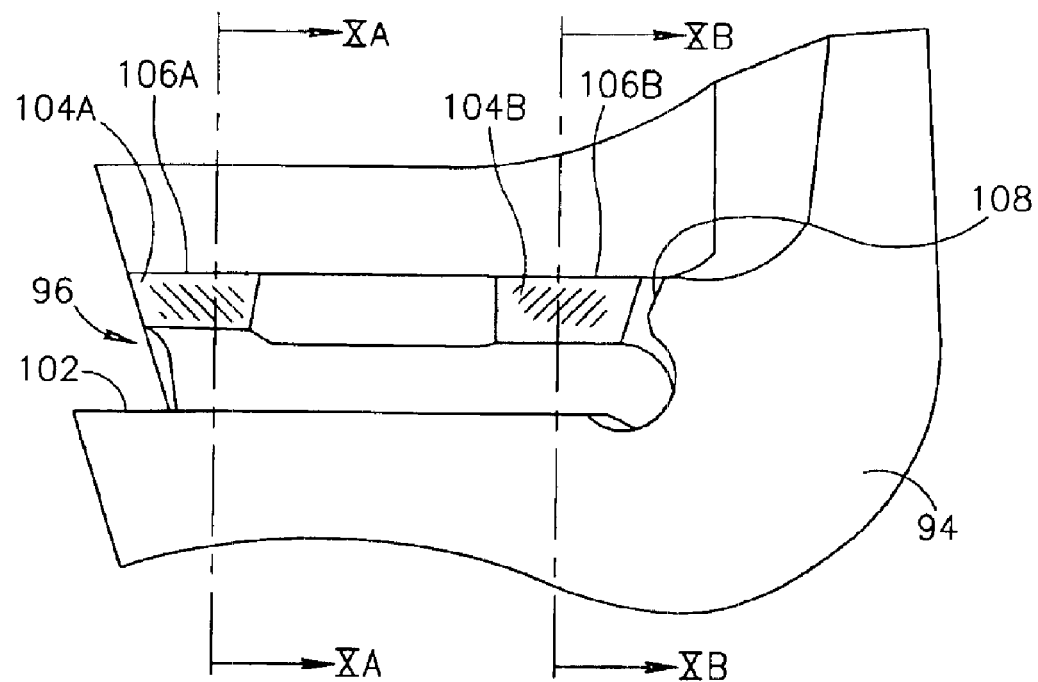
FIG. 9 is a side view of the insert pocket of FIG. 8.
Figures 10A, 10B:
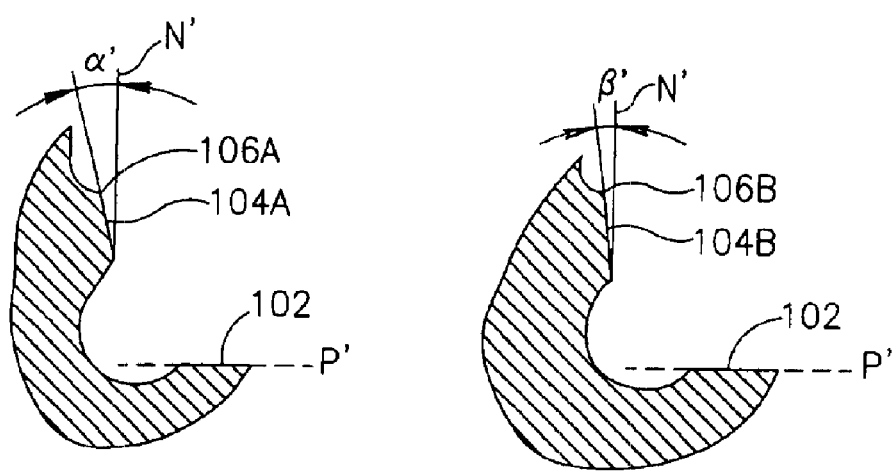
FIG. 10A is a partial cross-sectional view of the insert pocket shown in FIG. 9 taken along the line XA—XA.
FIG. 10B is a partial cross-sectional view of the insert pocket shown in FIG. 9 taken along the line XB—XB.
Figure 11:
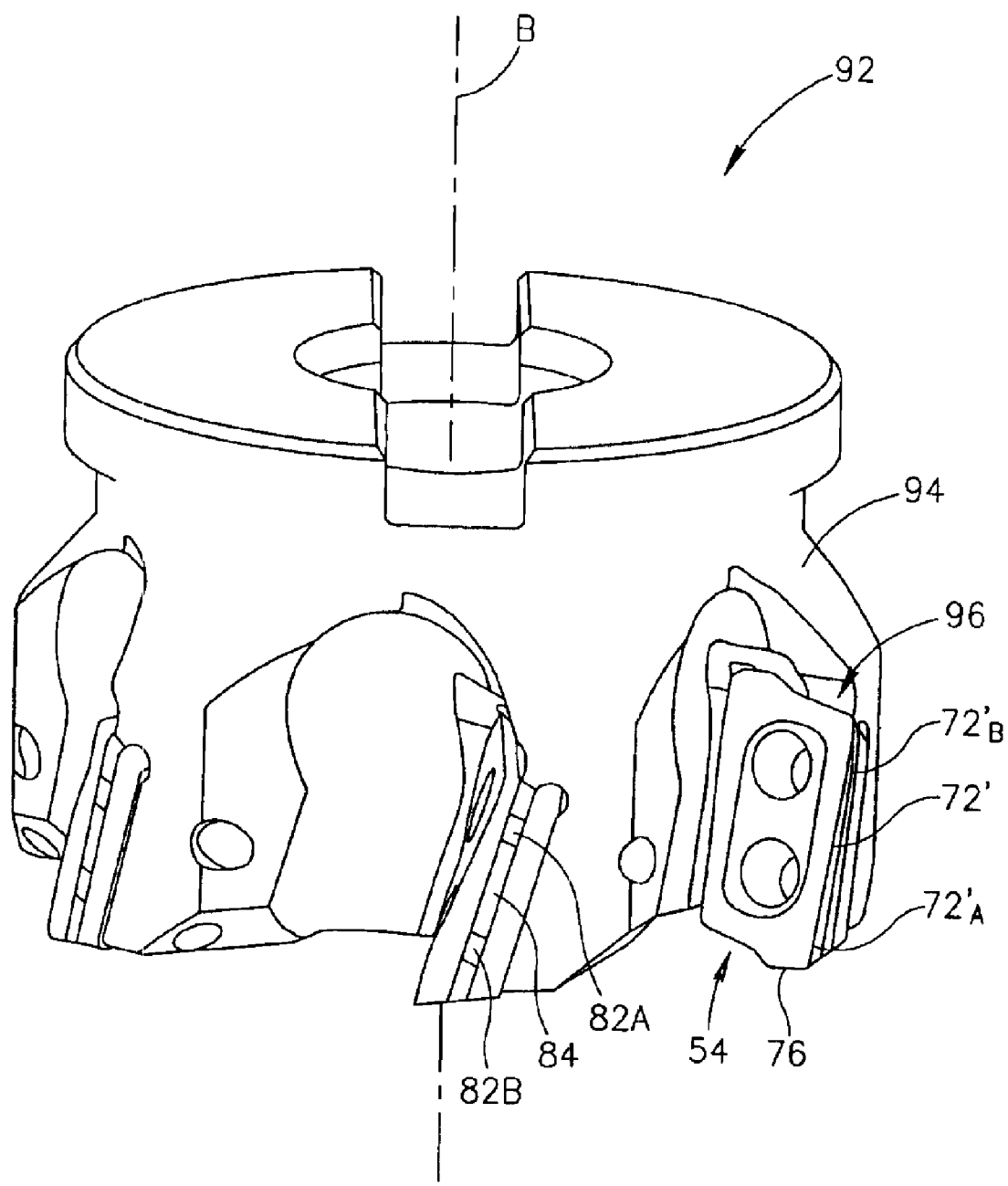
FIG. 11 is a perspective view of a milling cutter in accordance with the present invention.

A cutting insert 54 in accordance with the present invention is shown in FIGS. 5 to 7. The cutting insert 54 is typically manufactured by form-pressing and sintering carbide powders. However, injection-molding techniques can also be used. The cutting insert 54 is generally rhomboidal in shape having a top surface 56, a bottom surface 58 and a peripheral side surface 60 extending between the top and bottom surfaces 56, 58. The peripheral side surface 60 comprises two major side surfaces 62 and two minor side surfaces 64. Although the invention is described with respect to cutting inserts that are generally rhomboidal in shape it is equally applicable to cutting inserts that are generally rectangular or square in shape. The two minor side surfaces 64 are provided with protruding portions 66. The major and minor side surfaces 62, 64 join the top surface 56 along a top edge 68, and the bottom surface 58 along a bottom edge 70. FIG. 7 shows an illustrative bottom view of the insert of FIG. 5 seated in a cylindrical milling cutter in accordance with the present invention, the cylindrical milling cutter having an axis of rotation B. The milling cutter has been removed so that the radial location of various parts of the cutting insert with respect to the axis of rotation B can be seen. The axial rake cannot be distinguished in this view, hence it will appear that the axis B is parallel to the bottom surface 58 of the cutting insert 54, but this is not the case. As seen in FIG. 7, the top and bottom edges 68, 70 have a generally rhomboidal shape. The top edge 68 comprises two opposing major edges 72, constituting two major cutting edges, and two minor edges 74. It will be observed on comparing FIGS. 4 and 7 that the orientation of the bottom edge 70 of the cutting insert 54, in accordance with the present invention, relative to its top edge 68 is in an opposite sense in comparison with the orientation of the bottom edge 70 of the prior art cutting insert 12 relative to its top edge 24.

A section of each minor edge 74 located on an associated protruding portion 66 constitutes a wiper 76. The bottom edge 70 has two opposing long edges 78 and two opposing short edges 80. The cutting insert 54 has a basically positive geometry. That is, the included angle between the major and minor side surfaces 62, 64 and the bottom surface 58, taken between tangent planes to these surfaces at the bottom edge 70, is obtuse, whereas, the included angle between the major and minor side surfaces 62, 64 and the top surface 56, taken between tangent planes to these surfaces at the top edge 68, is acute.

Figure 3:
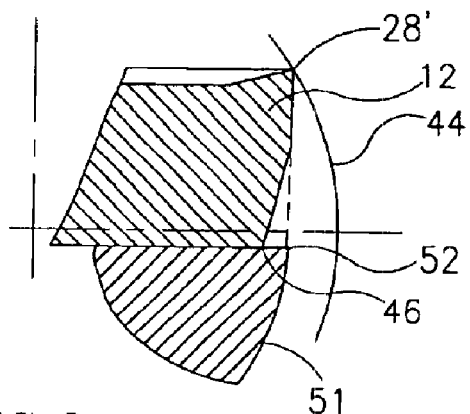
FIG. 3 is a partial cross-sectional view similar to that of FIG. 2A but with a cylindrical milling cutter body and a prior art cutting insert.

Referring back to FIG. 3, it is noted that if the prior art cutting insert 12 is seated in the cylindrical milling cutter 50, then the forward radially outer bottom corner 46, and consequently the long edge 34 of the bottom edge 26, of the cutting insert 12 will not reach the periphery 53 of the milling cutter 50. In order for the long edge 34 of the bottom edge 26 to reach the periphery 53 of the milling cutter 50, the bottom surface 16 of the cutting insert 12 has to be redesigned by effectively rotating the bottom surface 16 relative to the top surface 14 of the cutting insert 12. Referring now to FIG. 7, the consequence of this aspect of the redesign can be appreciated. It can be seen that in contrast to the prior art cutting insert 12, the cutting insert 54 in accordance with the present invention has an operative major cutting edge 72' in which its leading end 72'$_A$ is advantageously provided with greater support than its trailing end 72'$_B$.

It will be appreciated that if, after rotating the bottom surface 16, of the prior art insert 12, relative to the top surface 14, each long edge 34 of the bottom edge 26 is arbitrarily joined to its associated major edge 28 of the top edge by a surface, to obtain a major side surface, then that major side surface will be, disadvantageously, generally twisted.

In accordance with the present invention, each major side surface 62 comprises two spaced apart generally flat and non-coplanar abutment surfaces 82. A first 82A of the two spaced apart abutment surfaces 82 makes a first angle $\alpha$ with a normal N to a plane P passing through the bottom surface of the cutting insert and a second 82B of the two spaced apart abutment surfaces 82 makes a second angle $\beta$ with the normal N. In accordance with the present invention, the first angle $\alpha$ is greater than the second angle $\beta$. The abutment surfaces 82 do not intersect the major cutting edges 72.

The region of each major side surface 62 extending between the first and second abutment surfaces 82A, 82B forms an arbitrarily shaped central surface 84. Each major side surface 62 comprises an upper relief surface 86 disposed between the first and second abutment surfaces 82A, 82B and the central surface 84 and the major cutting edge 72. The upper relief surface 86 forms a relief angle $\gamma$ with the normal N. Preferably, for each major side surface 62, the upper relief surface 86 extends adjacent the major cutting edge 72 along the whole length of the major cutting edge 72.

Each major side surface 62 further comprises a lower relief surface 88 disposed between the first and second abutment surfaces 82A, 82B and the central surface 84 and the long edge 78 of the bottom edge 70 of the bottom surface 58. Preferably, for each major side surface 62, the lower relief surface 88 extends adjacent the long edge 78 of the bottom edge 70, associated with that major side surface 62, along the whole length of the long edge 78. It should be noted that in accordance with the present invention, when the cutting insert 54 is seated in a milling cutter 92, the radially outermost long edge 78 of the bottom edge 70 of the bottom surface 58 is located adjacent the periphery of the milling cutter. The width and slope of the lower relief surface 88 will influence the value of the first and second angles $\alpha$ and $\beta$. The cutting insert 54 is provided with two through bores 90 extending between the top and bottom surfaces 56, 58, which is generally required for relatively long cutting inserts.

Attention is now turned to FIGS. 8 to 11. A milling cutter 92 in accordance with the present invention has an axis of rotation B and comprises a cutter body 94 having insert pockets 96 in which the cutting inserts 54 are seated. Each insert pocket 96 comprises a side wall 98 adjacent a rear wall 100 and a base 102, to which the side and rear walls 98, 100 are generally transverse. The side wall 98 is provided with two spaced apart generally flat and non-coplanar side support surfaces 104 (104A, 104B), a forward side support surface 104A and a rear side support surface 104B. The rear wall 100 is provided with a rear support surface 108 having an upper edge 110. The side support surfaces 104 have upper edges 106 (106A, 106B), the forward side support surface 104A having an upper edge 106A and the rear side support surface 104B having an upper edge 106B. The forward side support surface 104A makes a third angle $\alpha'$ with a normal N' to a plane P' passing through the base 102 and the rear side support 104B surface makes a fourth angle $\beta'$ with the normal N'. In accordance with the present invention, the third angle $\alpha'$ is greater than the fourth angle $\beta'$.

The side support surfaces 104 and the abutment surfaces 82 are designed to slope at such angles so that when the cutting insert 54 is located in the insert pocket 96, the upper edges 106 of the side support surfaces 104 contact the abutment surfaces 82. The upper edges 106 of the side support surfaces 104 are straight edges and therefore the side support surfaces 104 contact the abutment surfaces 82 along a line. Specifically, the upper edge 106A of the forward side support surface 104A makes contact with the first abutment surface 82A along a line and the upper edge 106B of the forward side support surface 104B makes contact with the second abutment surface 82B along a line. In order to ensure that the upper edges 106 of the side support surfaces 104 contact the abutment surfaces 82 along a line, the slopes of the support and abutment surfaces are arranged such that the first angle $\alpha$ is greater than the third angle $\alpha'$ by a first angle difference $\delta_1$ and the second angle $\beta$ is greater than the fourth angle $\beta'$ by a second angle difference $\delta_2$. Preferably, the first and second angle differences $\delta_1$, $\delta_2$ are identical and equal to a given angle difference $\delta$. In accordance with a specific non-binding example, the first angle $\alpha$ is approximately 14°, the second angle $\beta$ is approximately 5° and the given angle difference $\delta$ is approximately 0.5°.

In a similar manner, the slope of the rear support surface 108 and the slope of the minor side surface 64 are so chosen to ensure that the upper edge 110 of the rear support surface 108 makes contact with the minor side surface 64 along a line. Therefore, the cutting insert 54 is supported in the insert pocket 96 by two contact regions on one side and one contact region on an adjacent side, giving rise to a stable and well defined seating of the cutting insert 54.

It is well known that during the manufacture of cutting inserts the micro insert surface geometry often becomes indeterminably distorted giving rise to an uneven surface quality. Hence, the abutment surfaces 82 may not be perfectly flat, even if they were designed to be flat. In such a case, the upper edges 106 of the side support surfaces 104 will contact the abutment surfaces 82 along a broken line.

Although the present invention has been described to a certain degree of particularity, it should be understood that various alterations and modifications can be made without departing from the spirit or scope of the invention as hereinafter claimed. For example, although the invention has been described for a cutting insert wherein the major side surfaces 62 have been described as having only one upper relief surface 86 adjacent the major cutting edges 72, two or more upper relief surfaces can also be provided. Similarly, whereas the major side surfaces 62 have been described as having only one lower relief surface 88 adjacent the long edge 78 of the bottom edge 70 of the bottom surface 58, two or more lower relief surfaces can also be provided. Either or both of the upper and lower relief surfaces 86, 88 can be designed to be very narrow, for example one millimeter, or less. Therefore, for example, the first and second abutment surfaces 82A, 82B and the central surface 84 could appear to extend from the major edge 72 to the associated long edge 78, or from below the upper relief surface 86 to the major edge 72.

What is claimed is:

1. A cutting insert comprising:
    a top surface, a bottom surface, and a peripheral side surface extending therebetween, the peripheral side surface comprising a pair of opposing major side surfaces and a pair of opposing minor side surfaces;
    two opposing major cutting edges formed at the intersection of the opposing major side surfaces with the top surface;
    wherein each one of the pair of opposing major side surfaces comprises two spaced apart generally flat and non-coplanar abutment surfaces;
    wherein a first of the two spaced apart abutment surfaces makes a first angle α with a normal N to a plane P passing through the bottom surface of the cutting insert and a second of the two spaced apart abutment surfaces makes a second angle β with the normal N; and
    wherein each major side surface further comprises at least one upper relief surface disposed between the abutment surfaces and the major cutting edge, and forming a relief angle γ with the normal N.

2. The cutting insert according to claim 1, wherein each major side surface further comprises at least one lower relief surface disposed between the abutment surfaces and the bottom surface.

3. The cutting insert according to claim 1, wherein the cutting insert is provided with at least one through bore extending between the top and bottom surfaces.

4. A milling cutter comprising:
    a cutter body having at least one insert pocket, the at least one insert pocket comprising adjacent side and rear walls generally transverse to a base, the side wall being provided with two spaced apart generally flat and non-coplanar side support surfaces, a forward side support surface and a rear side support surface, and
    a cutting insert seated in the at least one insert pocket, the cutting insert comprising:
        a top surface, a bottom surface, and a peripheral side surface extending therebetween, the peripheral side surface comprising a pair of opposing major side surfaces and a pair of opposing minor side surfaces;
        two opposing major cutting edges formed at the intersection of the opposing major side surfaces with the top surface;
    wherein;
        each one of the pair of opposing major side surfaces comprises two spaced apart generally flat and non-coplanar abutment surfaces;
        the two spaced apart generally flat and non-coplanar side support surfaces of the at least one insert pocket abut said two spaced apart generally flat and non-coplanar abutment surfaces belonging to one of said pair of opposing major side surfaces;
        a first of the two spaced apart abutment surfaces makes a first angle α with a normal N to a plane P passing through the bottom surface of the cutting insert and a second of the two spaced apart abutment surfaces makes a second angle β with the normal N; and
        the forward side support surface makes a third angle α' with a normal N' to a plane P' passing through the base and the rear side support surface makes a fourth angle β' with the normal N'.

5. The milling cutter according to claim 4, wherein the third angle α' is greater than the fourth angle β'.

6. The milling cutter according to claim 5, wherein the first angle α is greater than the third angle α' by a first angle difference $\delta_1$ and the second angle β is greater than the fourth angle β' by a second angle difference $\delta_2$.

7. The milling cutter according to claim 6, wherein the first and second angle differences $\delta_1$, $\delta_2$ are identical and equal to a given angle difference δ.

8. The milling cutter according to claim 7, wherein the forward side support surface has an upper edge and the rear side support surface has an upper edge and wherein the upper edge of the forward side support surface abuts the first abutment surface of a given major side surface of the at least one cutting insert and the upper edge of the rear side support surface abuts the second abutment surface of the given major side surface of the at least one cutting insert.

9. The milling cutter according to claim 8, wherein the first angle α is approximately 14°, the second angle β is approximately 5° and the given angle difference δ is approximately 0.5°.

10. The milling cutter according to claim 4, wherein the forward side support surface has an upper edge and the rear side support surface has an upper edge and wherein the upper edge of the forward side support surface abuts the first abutment surface of a given major side surface of the at least one cutting insert and the upper edge of the rear side support surface abuts the second abutment surface of the given major side surface of the at least one cutting insert.

11. A cutter body having at least one insert pocket, the at least one insert pocket comprising:
    adjacent side and rear walls generally transverse to a base, the side wall being provided with two spaced apart generally flat and non-coplanar side support surfaces, a forward side support surface and a rear side support surface, the forward side support surface makes an angle α' with a normal N' to a plane P' passing through the base and the rear side support surface makes an angle β' with the normal N', wherein the angle α' is greater than the angle β'.

* * * * *